Patented Sept. 5, 1950

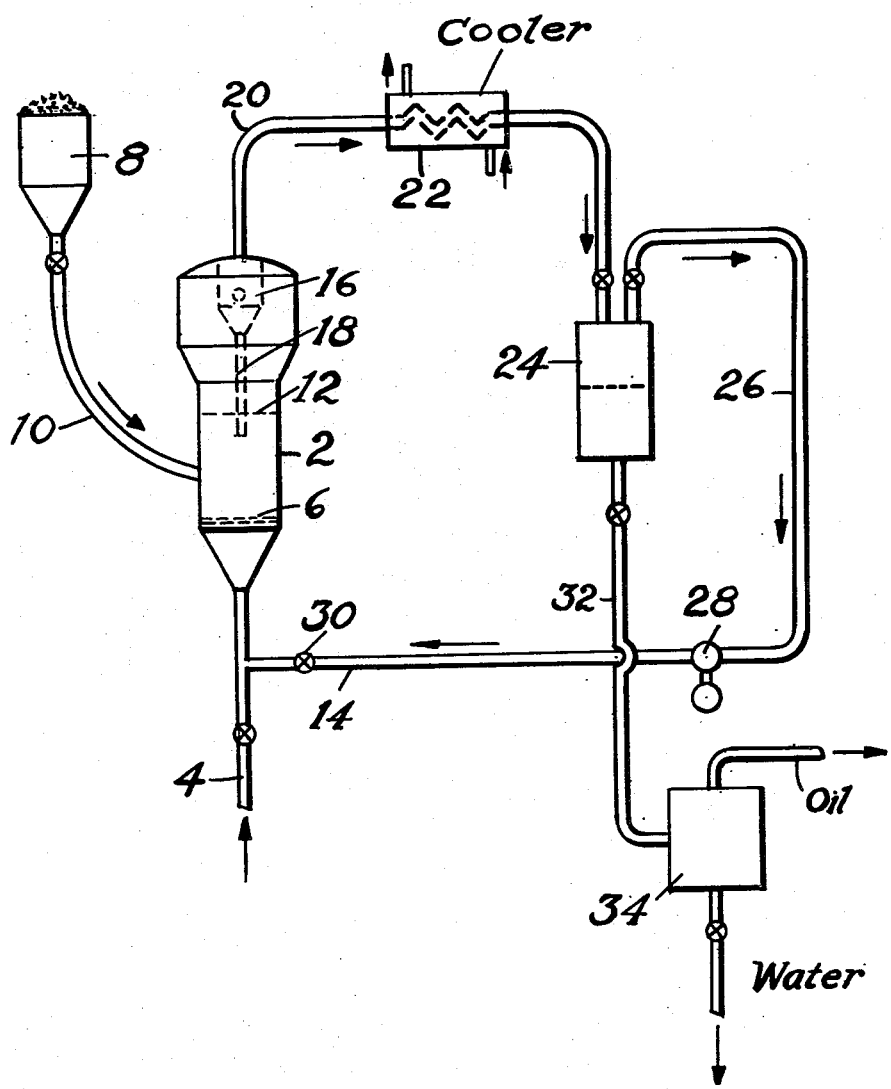

2,521,436

UNITED STATES PATENT OFFICE 2,521,436

FATTY ACID PRODUCTION IN HYDROCARBON SYNTHESIS

Charles H. Worsham, Fanwood, and Clinton H. Holder, Cranford, N. J., assignors to Standard Oil Development Company, a corporation of Delaware Application September 3, 1948, Serial No. 47,706

2 Claims. (Cl. 260—449.6)

This invention relates to the synthesis of hydrocarbons and oxygenated hydrocarbons from the catalytic interaction of carbon monoxide and hydrogen. More particularly, this invention relates to a process for increasing the amount of acids which may be recovered from such a process.

It is well known in the art that mixtures of carbon monoxide and hydrogen when brought into intimate contact with suitable catalysts under suitable reaction conditions are converted into hydrocarbons and oxygenated hydrocarbons. It is also known that the nature of the products are in general, a function of the reaction conditions, such as temperature, pressure, contact time, nature of the catalyst, and the like. Thus it has been established that in general, increasing the pressure increases the formation of oxygenated organic products, and also that alkali metal promoted iron type catalysts favor oxygenated conversion products as against cobalt-type catalysts.

Among the most valuable products resulting from this synthesis are the low molecular weight fatty acids, mainly acetic, which are found in the aqueous layer resulting from this synthesis. These acids have a large market as intermediates in the manufacture of cellulose acetates, which are used in large quantities in the manufacture of synthetic fibres, textiles and plastics. For this reason, it is highly desirable to increase to the greatest possible extent, the yields of these acids in the hydrocarbon synthesis.

Desirable as it is to produce high yields of fatty acids in this catalytic synthesis process, it has hitherto been found that these steps and means which increase the quantity of acids produced, unfortunately have the concomitant effect of increasing seriously the quantity of carbon formed and deposited on the catalyst in the course of the reaction. This carbon formation is a serious problem, particularly when the catalytic synthesis operation is carried out by the fluid solids technique, which latter, because of better heat distribution, transfer and control, and because of the more intimate mixing and contact of the catalyst with the reactants, is far superior to the fixed bed processes for effecting the hydrocarbon synthesis operation. However, two problems that arise in conjunction with the fluid solids type of operation are the fouling and consequent inactivation of the catalyst by carbon deposition, and the tendency of the catalyst particles to disintegrate, due probably to this carbon formation. Among the factors that favor carbon formation in the synthesis are low ratios of hydrogen to carbon monoxide in the synthesis gas, low hydrogen partial pressures in the synthesis reactor, and high ratios of recycle tail gas to fresh feed going to the synthesis reactor, and these variables also favor formation of acids in the synthesis reaction. Carbon formation and catalyst disintegration not only cut down on product yield but eventually cause poor fluidization of the catalyst, excessive fines formation, catalyst agglomeration and conditions requiring plant shutdown.

It is the principal purpose of the present invention to provide an improved process for the conversion of carbon monoxide and hydrogen to give high yields of fatty acids without forming excessive amounts of carbon during the conversion and without excessive fragmentation of the catalyst.

Other and more specific objects and advantages of the invention will appear hereinafter.

It has now been found that the yields of acids resulting from the hydrocarbon synthesis reaction are related to the carbon dioxide concentration of the total feed to the synthesis reactor, the yield increasing, first rapidly, then more slowly, with increase in the carbon dioxide concentration in the total feed to the reactor. This relationship has been found to hold generally, irrespective of the nature of the iron-type hydrocarbon synthesis catalyst and of the reaction pressures employed within 200–700 p. s. i. g. Thus when employing a sintered $K_2CO_3$ promoted red iron oxide catalyst in a synthesis reaction, and an $H_2/CO$ ratio of 1.7/1, increasing the carbon dioxide content in the total feed from 12% to 56% increased the acid yield from 13 to 30 cc./m.$^3$ of converted $H_2+CO$.

Desirable as it is, therefore, to maintain high concentrations or partial pressures of carbon dioxide in the hydrocarbon synthesis reaction zone, it has, hitherto been found that these conditions favoring high $CO_2$ concentrations in the synthesis reactor also cause high carbon deposition on the catalyst. Thus high recycle rates and high ratios of recycle tail gas to fresh feed, increase the $CO_2$ concentration in the reactor by recycling thereto, the $CO_2$ produced by the synthesis reaction. However, as a result of the dilution effect and of the interaction of the $CO_2$ with the $H_2$ in the synthesis zone to produce CO and $H_2O$, the hydrogen partial pressure within the reaction zone is lowered, favoring carbon deposition. Similarly, increasing the conversion level of synthesis gas increases the $CO_2$ content of the reactor, but by decreasing the hydrogen partial pressure within the reactor, excessive carbon again is formed. Similarly, low $H_2/CO$ ratios in the total feed to the synthesis reactor is conducive both to the formation of relatively large quantities of fatty acids and also large quantities of carbon.

It has now been found that high yields of fatty acids, mainly acetic acid, may be formed at low carbon formation rates when a hydrocarbon synthesis process is operated at pressures of about 500 to 700 p. s. i. g., recycle to fresh feed ratio of 1 to 2/1, $H_2/CO$ ratio in the fresh feed of 1.0–1.3/1 and a synthesis gas conversion level of about 93% is maintained. Under these conditions a high $CO_2$ concentration of above 30% is maintained in the total feed to the reactor, as well as a relatively high hydrogen partial pressure of above 175 p. s. i., favoring low carbon production. Surprisingly, the low $H_2/CO$ ratios employed in accordance with the invention, which ratio ordinarily is associated with high carbon production, are under the conditions delineated in the present invention, not conducive to high deposition of carbon on the catalyst.

That these conditions are critical is attested by the fact that by increasing the recycle ratio, or decreasing the total pressure or increasing the synthesis gas conversion level, all decrease the hydrogen partial pressure and thus increase the extent of deposition of carbon on the catalyst. On the other hand, if the $H_2/CO$ ratio is increased, the carbon formation rate is decreased but so also is the yield of fatty acids, because the $CO_2$ content of the recycle gas is diminished.

The process of the present invention may be carried out in any conventional equipment adapted to fluid catalyst operation. A system suitable for this purpose is shown semi-diagrammatically, in the accompanying drawing, which is used to describe, in greater detail, the operation of the present invention on one of its embodiments.

Referring now to the drawing, 2 represents a reactor which is preferably in the form of a vertical cylinder having a lower conical section and an upper expanded section. A synthesis fresh feed gas mixture comprising hydrogen and carbon monoxide in the ratio of about 1.0–1.3 mols $H_2$ per mol CO is introduced into reactor 2 through line 4 and flows upwardly through a screen or grid 6 to effect good gas distribution.

Within reactor 2, a mass of iron catalyst such as sintered reduced red iron oxide or ammonia synthesis catalyst (fused reduced magnetite promoted with potassia and alumina) is maintained in the form of a powder having a particle size distribution such that less than 20% of the particles have diameters 0–20 microns and less than 10% of the particles have diameters larger than 80 microns. The catalyst may be promoted with an alkali promoter, such as 0.5–1.5% $K_2CO_3$, and may be supplied to reactor 2 from catalyst hopper 8 through line 10.

The linear inlet velocity of the gases to the reactor 2 is maintained within the aproximate range of 0.3–5.0 feet per second, preferably between 0.4–1.5 feet per second. Under these conditions the catalyst in reactor 2 assumes the form of a dense, turbulent mass, resembling a boiling liquid, with a more or less well-defined upper level 12, and an apparent density of about 25–75 lbs./cu. ft. depending upon the fluidization conditions, the lower apparent density being associated with the higher velocities. The amount of synthesis gas supplied through line 4 is so controlled that 5 to 50 normal cubic feet of $H_2+CO$ enters reactor 2 per pound iron catalyst per hour.

Within reactor 2 the total pressure is adjusted to about 500 to 700 lbs./sq. in. The synthesis gas constituents which are supplied both as fresh feed and as recycle tail gas, are supplied and adjusted such that the absolute hydrogen partial pressure in the total feed to reactor 2 is maintained in the range of 150 to 300 p. s. i., preferably 175 to 250 p. s. i. The ratio of $H_2/H_2+CO+CO_2$ in the feed is maintained preferably below 0.65.

Although admitted to reactor 2 through lines 14 and 4, is tail gas as described more fully below. Thus gas from which the bulk of the water formed in the synthesis has been removed, contains carbon dioxide up to 65 volume percent, and is recycled to the synthesis step at the rate of 1 to 2 volumes recycle gas per volume fresh feed. As a result of the reaction conditions enumerated above, and of the velocities and throughput rates of the synthesis gases, a $CO_2$ partial pressure of about 150 to 275 p. s. i, and an $H_2+CO$ conversion level of about 90 to 93% but no higher than 97%, are maintained within reactor 2.

When entering the enlarged section of reactor 2, the fluidizing gas velocity is sufficiently decreased so that the gas will no longer support any substantial quantity of catalyst, and most of the catalyst particles entrained in the gas drop back into the fluidized mass.

The reaction temperature may be controlled by any convenient means, such as cooling coils or jackets inside or outside reactor 2. The temperature within the fluidized mass is kept uniform at about 625 to 675° F.

The volatile reaction products, containing only small quantities of entrained catalysts, are passed through a gas-solids separator 16, such as a cyclone, filter, etc. This removes all but traces of entrained fines, and the catalyst and fines thus removed may be returned through line 18 to the fluidized bed in reactor 2.

Product vapor and gases may be withdrawn overhead through line 20, and passed through cooler 22 to liquid-gas separator 24. Tail gas is passed overhead from separator 24 through line 26, and may be passed to pump 28. From recycle pump 28, the tail gas is pumped through line 14 to reactor 2 as recycle gas. Valve 30 is so adjusted that the ratio of recycle to fresh feed is proportioned as desired, within the reactor, preferably in the ratio of 1–2 volumes recycle per volume fresh feed. The tail gas, besides containing preferably 48 to 62% $CO_2$, comprises as well unreacted $H_2$ and CO and light gaseous hydrocarbons.

Liquid products may be withdrawn from separator 24, via line 32 and passed to settler 34, where the upper oil layer, containing the bulk of the hydrocarbons is separated from the lower aqueous layer, wherein the desired acids are found. Oil and water layers may be removed separately from 34 and the respective liquids processed by any method known in the art. Thus the acids which in accordance with the present invention are formed in yields of about 25–28 cc./m.$^3$ of converted $H_2+CO$, are found predominantly in the aqueous layer, and may be recovered by fractional or extractive distillation, solvent extraction, etc., all in a manner known per se.

The embodiment of the invention as shown in the drawing permits of many modifications. Thus it may be desirable to add extraneous $CO_2$ from some outside source along with the recycle gas to reactor 2. It may also be desirable, under certain circumstances, to add water vapor to the feed to the synthesis reactor. If large quantities of $CO_2$ are desired, it may be advantageous to pass the tail gas from the synthesis reactor 2 and separator 24 through a carbon dioxide scrubber, scrub out $CO_2$, desorb $CO_2$ by any suitable means and pass the $CO_2$ directly as such to the synthesis reactor, rather than diluted with unreacted tail gas and with gaseous hydrocarbons. By this type of operating it is possible to employ synthesis gas mixtures wherein the $H_2/CO$ ratios are higher than the 1.0–1.3 to 1 of the present invention; such higher ratio gases generally are produced by methane or natural gas reforming and partial combustion of light hydrocarbons.

The invention may be further illustrated by the following specific examples.

EXAMPLE I

To point out the effect of $CO_2$ content in the total feed gas upon the yield of acids obtainable from the hydrocarbon synthesis process, experiments were carried out in which the total pressures varied from 225–650 p. s. i. g. The temperature was 650° F. and the $H_2/CO$ ratio of the synthesis gas was 1 to 2 $H_2/CO$. Both ammonia synthesis catalyst and sintered $K_2CO_3$ red iron oxide catalyst were employed. The following table shows how the acid yield increases at first rapidly and then more slowly as the $CO_2$ content of the total feed is increased.

*Acid production rate*

| Percent $CO_2$ in Total Feed | Increase in Acid, cc./m.$^3$ $H_2+CO$ Converted | Total Acids, cc./m.$^3$ $H_2+CO$ Converted |
|---|---|---|
| 0–5 | 6.0 | 6.0 |
| 5–10 | 5.5 | 11.5 |
| 10–15 | 5.0 | 16.5 |
| 15–20 | 3.5 | 20.0 |
| 20–25 | 3.0 | 23.0 |
| 25–30 | 2.0 | 25.0 |
| 30–35 | 1.0 | 26.0 |
| 35–40 | 1.9 | 27.0 |

This table indicates that at about 30% $CO_2$ concentration, an acid yield of about 25 cc./m.$^3$ $H_2+CO$ converted is obtained. Higher concentrations of $CO_2$ give only small increases in acid yields, i. e., about 1 cc./m.$^3$ of converted $H_2+CO$ for a 5% increase of $CO_2$ in the total feed.

EXAMPLE II

To show the high acid yields obtainable when operating under the conditions delineated in accordance with the invention, data from a pilot plant run are given in column A. Columns B and C show that operating outside these limits decreases acid and/or increases carbon.

*Pilot plant data*

| Column | A | B | C |
|---|---|---|---|
| Catalyst | Sintered, 1.2–1.5% | $K_2CO_3$ Promoted | Red Iron Oxide |
| Run Number | FSU 2-9D | FSU 1-11 | FSU 2-8B |
| Catalyst Age, Hrs | 448–496 | 234–246 | 229–289 |
| Average Catalyst Temp., °F | 647 | 654 | 653 |
| Fresh Feed $H_2/CO$ Ratio | 1.1 | 2.0 | 2.0 |
| Fresh Feed, V./Hr./W | 30 | 5 | 13 |
| Pressure, p. s. i. g | 647 | 400 | 396 |
| Total Recycle Ratio | 1.4 | 2.8 | 2.4 |
| Total Feed Composition: | | | |
| $H_2$, Volume Per Cent | 32.0 | 31.3 | 37.2 |
| CO, Volume Per Cent | 25.5 | 10.9 | 12.6 |
| $CO_2$, Volume Per Cent | 27.7 | 12.4 | 10.7 |
| $P_2/H_2+CO+CO_2$ | 0.38 | 0.70 | 0.61 |
| $H_2$ Partial Pressure, p. s. i. | 212 | 130 | 154 |
| $H_2+CO$ Conversion, Volume Per Cent | 92 | 97 | 96 |
| $C_4+$Oil yield, cc./m.$^3$ of converted $H_2+CO$ | 165 | 137 | 139 |
| Yield of Acids, cc./m.$^3$ of converted $H_2+CO$ | 25.4 | 14.7 | 14.2 |
| Carbon Formation, gm./m.$^3$ of converted $H_2+CO$ | 0.4 | 1.2 | 0.9 |

The above examples and exemplary operations help point up the advantages and benefits to be derived from operating under the conditions wherein high $CO_2$ concentrations are maintained in the hydrocarbon synthesis reaction zone, and delineate the variables and define the limits wherein successful operation is possible, applying the fluid catalyst technique. Thus low $H_2/CO$ ratio in the synthesis gas, relatively low ratio of recycle to fresh feed, relatively high total pressures, and maintaining a moderate synthesis gas conversion level at about 93% by regulating the ratio of synthesis gas to catalyst in the reactor, high yields of fatty acids are obtainable without excessive formation of carbon within the reaction zone.

While the foregoing description and exemplary operations have served to illustrate specific applications and results of the invention, other modifications obvious to those skilled in the art are within its scope.

What is claimed is:

1. An improved process for producing valuable fatty acids from CO and $H_2$ without excessive deposition of solid carbonaceous material which comprises feeding a synthesis gas mixture containing $H_2$ and CO in the ratio of about 1.0 to 1.3 volumes of $H_2$ per volume of CO into a dense fluidized bed of finely divided potassium carbonate promoted sintered reduced red iron oxide catalyst in a reaction zone, maintaining a total pressure of about 500 to 700 p. s. i. g. within said zone, maintaining a hydrogen partial pressure within said zone in the range of from about 150 to about 300 p. s. i., maintaining a temperature of from about 600° to about 700° F. within said zone, maintaining a fresh feed gas rate of from about 5 to about 50 cubic feet per pound of catalyst per hour to said zone, withdrawing conversion products and unconverted gases from said zone, recycling tail gas to said zone in the ratio of about 1 to 2 volumes of tail gas per volume of fresh feed, maintaining an $H_2+CO$ conversion level of about 92 to 93% within said zone, maintaining a carbon dioxide concentration in said feed gas of about 25 to 40% and recovering a product containing substantial quantities of fatty acids.

2. An improved process for producing valuable fatty acids from CO and $H_2$ without excessive deposition of solid carbonaceous material which comprises feeding a synthesis gas mixture containing $H_2$ and CO in the ratio of about 1.0 to 1.3 volumes of $H_2$ per volume CO into a dense fluidized bed of finely divided iron-containing catalyst in a reaction zone, maintaining a total pressure of about 500 to 700 p.s.i.g. within said zone, maintaining a hydrogen partial pressure within said zone in the range of from about 150 to about 300 p.s.i., maintaining a temperature of from about 600° to 700° F. within said zone, maintaining a fresh feed gas rate of from about 5 to about 50 cubic feet per pound of catalyst per hour to said zone, maintaining a moderate $H_2$ to CO conversion level of about 92 to 93%, withdrawing conversion products and unconverted gases from said zone, recycling tail gas to said zone in the ratio of 1 to 2 volumes of tail gas per volume of fresh feed, maintaining carbon dioxide concentrations in said feed gas of about 25 to 40%, and recovering a product containing substantial quantities of fatty acids.

CHARLES H. WORSHAM.
CLINTON H. HOLDER.

REFERENCES CITED

The following references are of record in the file of this patent:

UNITED STATES PATENTS

| Number | Name | Date |
|---|---|---|
| 2,231,990 | Dreyfus | Feb. 18, 1941 |
| 2,248,099 | Linckh | July 8, 1941 |
| 2,436,957 | Eastman | Mar. 2, 1948 |